April 22, 1952  H. P. BURRELL  2,593,532
IMPACT DRILL APPARATUS
Filed June 13, 1946  4 Sheets-Sheet 1

FIG.I.

INVENTOR.
HAROLD P. BURRELL
BY
ATTORNEY.

April 22, 1952  H. P. BURRELL  2,593,532
IMPACT DRILL APPARATUS
Filed June 13, 1946  4 Sheets-Sheet 2

INVENTOR.
HAROLD P. BURRELL
BY
ATTORNEY.

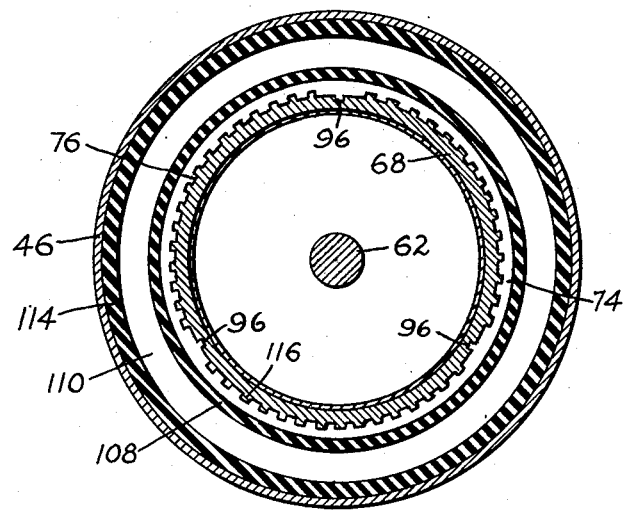
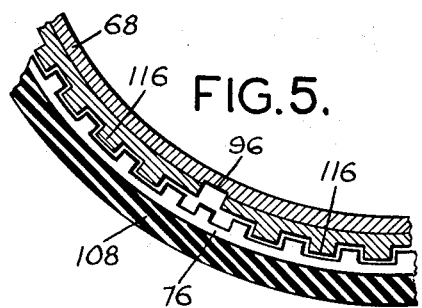
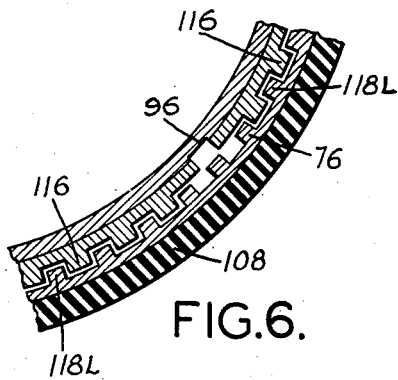
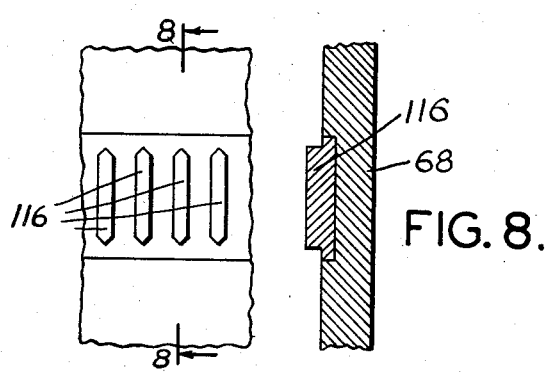

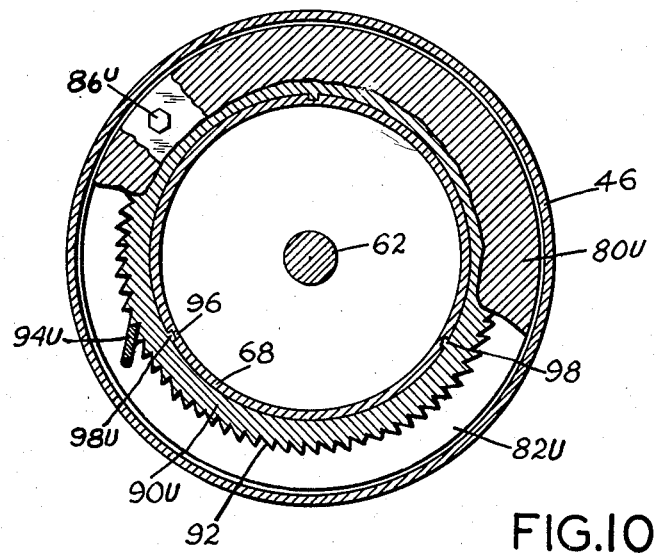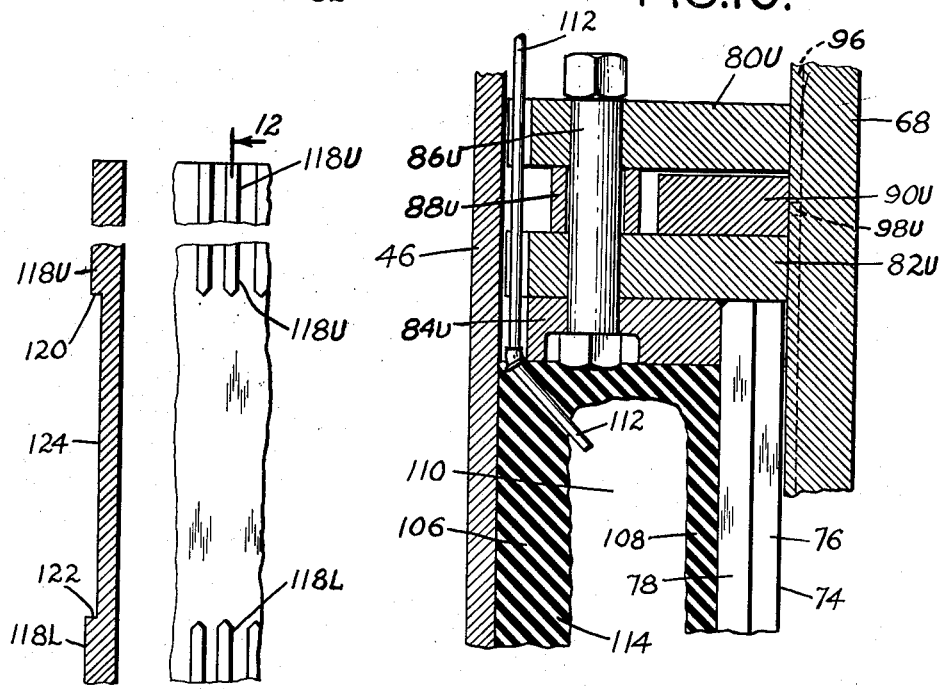

Patented Apr. 22, 1952

2,593,532

UNITED STATES PATENT OFFICE 2,593,532

IMPACT DRILL APPARATUS

Harold P. Burrell, Noroton, Conn.

Application June 13, 1946, Serial No. 676,482

4 Claims. (Cl. 255—5)

1

This invention relates to drilling apparatus, designed primarily for drilling holes in rock formations.

One of the objects of the invention is to provide a new and improved device for the drilling of vertical and inclined holes in rock formations.

Another object of the invention is to provide a rock drill with which inclined holes may be quickly and efficiently formed in rock formations, and in which the drilling bit is axially rotatable in step by step fashion as the drilling progresses, thus drilling the hole evenly and smoothly.

Still another object of the invention is to provide a rotatable rock drill for drilling inclined holes in rock formations, in which the drilling bit is carried by a drilling shaft passing through a housing member which can be locked at any location in the caisson pipe or socket, and is provided with means for causing the drill shaft passing through it to rotate by a predetermined amount between each blow, but which is locked against rotation at other times such as at the moment of impact of the drill bit against the rock.

Other objects and advantages of my invention will become apparent from the following description of a preferred embodiment thereof as illustrated in the accompanying drawings and in which, Figure 1 is a partly diagrammatic perspective view of my improved rock drill in position in a caisson pipe during the drilling of an inclined hole;

Figure 4 is a transverse sectional view taken on line 4—4 of Figure 2;

Figure 5 is an enlarged fragmentary view of a portion of Figure 4;

Figure 6 is an enlarged sectional view in fragment such as might be seen on line 6—6 of Figure 3;

Figure 7 is an elevational view in fragment of a portion of the cylinder of the rock drill showing the fins protruding therefrom;

Figure 8 is a sectional view taken on line 8—8 of Figure 7;

Figure 9 is a transverse sectional view taken on line 9—9 of Figure 2;

Figure 10 is a fragmentary view in sectional

2 elevation showing the rubber bag inserted between the housing and the inner caisson wall;

Figure 11 is an elevational view in fragment of the inner surface of the housing showing its longitudinal grooves, and Figure 12 is a sectional view taken on line 12—12 of Figure 11.

This invention is of particular value in drilling inclined holes of large diameter into rock situated far below the surface of the earth, such as would be required for the type of foundation described and claimed in my copending application Serial No. 55,540, filed October 20, 1948.

To permit the formation of a socket in the rock at an angle inclined to the vertical, I propose the use of the herein described drilling method and drilling device.

Figure 1:
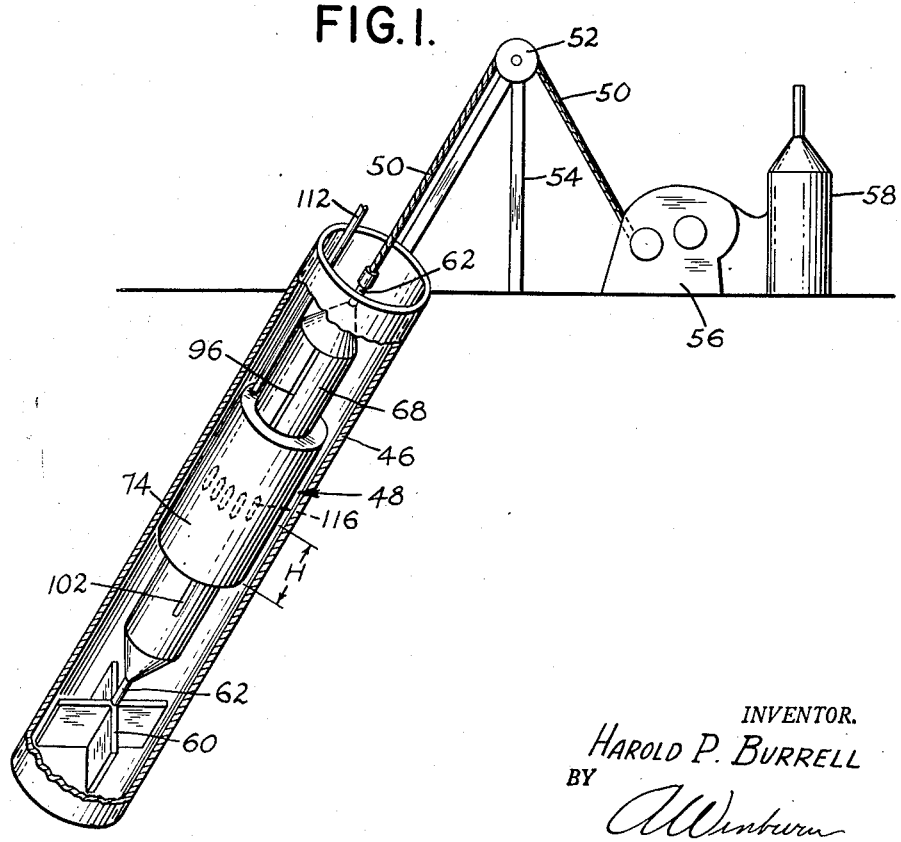
Figure 2:
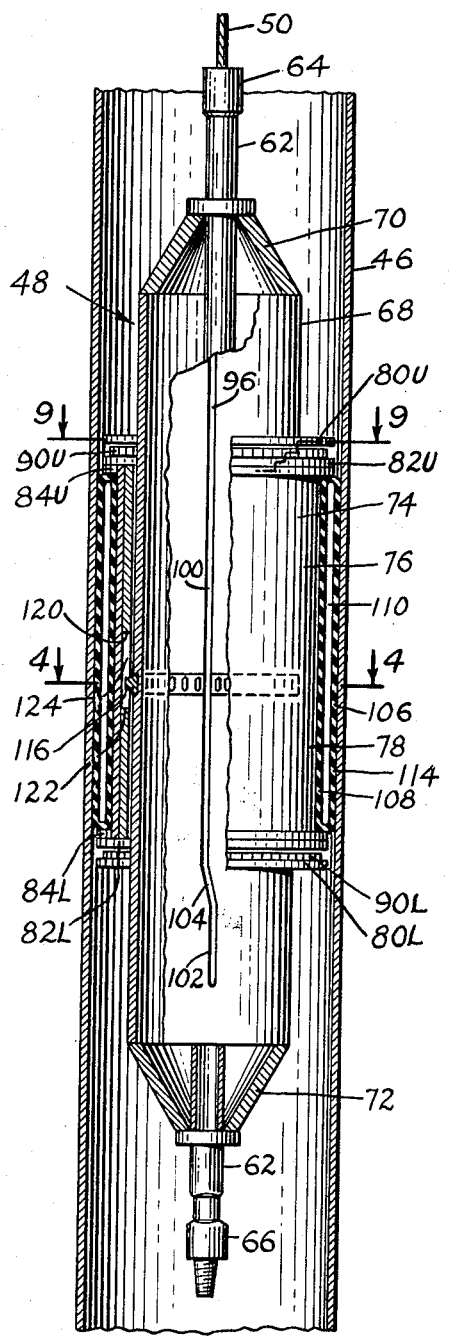
Figure 2 is a longitudinal partly sectioned view of my improved rock drill disposed within a caisson.
Figure 3:
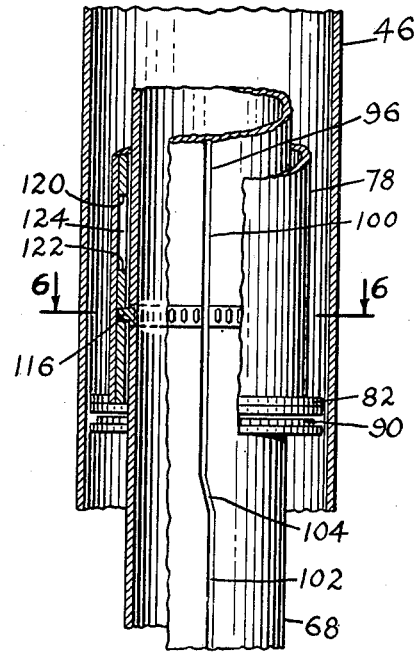
Figure 3 is a longitudinal partly sectioned fragmentary view of the drill shown in Figure 2, but at a different stage of its cycle, and with the rubber bag omitted.

As shown in Figure 1, there is a caisson pipe 46 which has been driven, at an angle from the vertical, into the ground and down until it reaches a rock formation. With the contents of the pipe 46 removed therefrom in any suitable manner, my improved rock drill, indicated generally at 48, is then lowered into the pipe 46, being suspended at its upper end by means of a cable 50 which extends up over a sheave 52 supported on uprights 54, to a hoisting engine 56 which may be driven in any suitable manner such as by steam derived from a boiler 58.

A drill bit 60 is secured to the lower end of the rock drill 48 and it is customary to alternately raise the rock drill by means of the engine 56 and then allow it to drop, thereby cutting the rock and thus drilling the socket into the rock. When the caisson pipe is vertical, and a string of drill tools hangs from the end of the cable, it is free to rotate about the axis of the cable. Thus, as the drill is lifted and dropped, it is liable to fall in a different radial location with each blow, and hence to tend to wear away the rock evenly all over the bottom of the socket, forming a hole in the rock. When the drill hangs from the end of a cable in an inclined hole, it will lie on the side of the hole, and is not free to turn, but will instead strike each successive blow in substantially the same place where the last one fell. The chisel shaped drill would soon cut a groove in the rock into which the drill would fall without further cutting.

According to my invention, I rotate the drill slightly after each blow is struck, thus causing the next blow to be struck at a point radially displaced from the previous one. I also provide means whereby the drill is held against rotation at the moment of impact on the rock, inasmuch as if it is free to turn it may strike only a glancing blow with little or no cutting value. My invention may also be applied to rock drills for drilling vertical holes, since a considerable increase in efficiency results.

These desirable characteristics are imparted to my method of drilling by providing a cylindrical drill shaft that passes through a housing member which can be locked at any location to the caisson pipe or socket and is provided with means for causing the drill shaft passing through it to rotate by a predetermined amount after each blow, but preventing rotation at other times, especially at the moment of impact on the rock.

As illustrated, there is a standard drill bar 62 with its upper end 64 secured to the lifting cable 50, and its lower end 66 threaded for engagement with a drilling bit 60. A hollow cylinder 68 has upper and lower frusto-conical end portions 70 and 72 by which the cylinder is rigidly secured to the coaxial drill bar 62. A housing 74 has a hollow cylindrical main body portion 76 the outer surface 78 of which is spaced from the inner walls of the caisson pipe 46, the cylinder 68 being slidably disposed within the housing 74. Mutually spaced annular end upper plates 80U and 82U are secured to each other and to the upper end flanges 84U of the main body portion 76 by means of upper bolts 86U, as shown, upper spacers 88U serving to keep the plates 80U and 82U spaced from and parallel to each other. Similarly, mutually spaced annular lower end plates 80L and 82L are secured to each other and to the lower end flanges 84L of the main body portion 76 by means of lower bolts (not shown) similar to the bolts 86U, lower spacers (not shown) similar to the spacers 88U serving to keep the plates 80L and 82L spaced from and parallel to each other.

Annular upper and lower ratchet wheels 90U and 90L, respectively, each having teeth 92, are disposed in the space between 80U and 82U and 80L and 82L. The cylinder 68 passes through the annular ratchet wheels 90U and 90L and is free only to slide axially within said wheels, relative rotary motion being prevented by studs 98U on the wheel 90U and similar studs (not shown) on the wheel 90L carried on the inside surface of said wheels 90U and 90L and extending into grooves 96 cut on the surface of cylinder 68. The wheels 90U and 90L are prevented from turning in a counter clockwise direction due to the action of the pawls 94U and similar pawls (not shown) which are pivoted to one or both of the plates 80U and 82U or 80L and 82L, their free ends engaging teeth 92. Each groove 96 consists of two groove sections 100 and 102 parallel to the axis of the cylinder 68, and a short inclined connecting groove section 104.

A hollow annular bag 106 of rubber or other suitable material, has its inner wall 108 connected to the outer surface of the housing surface 78, and when air is pumped into the bag chamber 110 through pipe 112, the outer wall 114 of the bag 106 is expanded outwardly against the inner surface of the caisson pipe 46 or the rock socket, thereby locking the housing to the pipe or socket. As the cylinder 68 moves upward relative to the housing 74, the stud 98U in the upper wheel 90U and the studs (not shown) in the lower wheel 90L similar to the studs 98U move in the grooves 96. At the same time the vanes 116 attached to the cylinder 68 travel upwards in the grooves between the longitudinal ribs 118L and 118U in the inner surface of the housing 74, the ribs 118U and 118L being interrupted between locations 120 and 122 to form a slot 124. The number of grooves is the same as the number of teeth in the ratchet or gear wheels 90U and 90L. When the stud in the lower ratchet wheel 90L enters inclined groove 104 from the groove 100, the bottom of the vanes 116 clear the bottom of the slot 124 cut in the ribs 118U and 118L so that the vanes 116 are free to rotate with the cylinder 68.

As cylinder 68 continues to rise it causes relative rotation of the cylinder and the ratchet wheels, due to the camming action of inclined groove 104, the tendency being to turn the ratchet wheels counterclockwise. Such movement is prevented by pawl 94U engaging the teeth of the upper ratchet wheel 90U and a similar pawl (not shown) engaging the teeth of the lower ratchet wheel 90L and accordingly the cylinder 68 must turn in a clockwise direction. When the stud 98 enters groove 102, the rotation of the cylinder is over and the upper edge of the vanes 116 re-enters the grooves between the ribs 118U as the cylinder continues to rise.

The cable 50 having been wound in sufficiently to allow the drill 60 to have a reasonable stroke, it is released allowing the drill to fall. The groove 102 slides over the stud in the lower ratchet wheel 90L. The vanes 116 slide at this time in the grooves between the ribs 118U and the groove 100 slides over the stud 98U in the upper ratchet wheel 90U. When the lower end of groove 104 engages the stud in the lower ratchet wheel the vanes 116 will be in the slot 124, allowing the cylinder 68 to rotate freely.

In its downward passage over the said stud in the lower ratchet wheel 90L, groove 104 tends to impart an anti-clockwise motion to the cylinder 68, which is, however, prevented by the stud 98U which is held in groove 100 and fastened to the upper ratchet wheel 90U which is in turn locked by the upper pawl 94, and therefore the lower ratchet wheel 90L is forced to turn in a clockwise direction by the amount of one tooth.

The component parts are now in the relative position which they occupied at the commencement of the operation, except that the drill has been rotated by one tooth of the ratchet wheel in a clockwise direction in relation to the housing and the caisson. The drill is prevented from sliding or rotating at the moment of impact because the vanes 116 traveling in the grooves between the ribs 118L allow only vertical movement except when the lower stud on the lower ratchet wheel 90L is passing through the inclined slot 104.

When the hole has been drilled to the required depth, the air is released from the elastic bag which collapses and allows the whole of the drilling equipment to be withdrawn.

A change in the direction of the axis of the rock socket may be brought about by inclining the axis of the drill bar 62 and the cylinder 68 in relation to the axis of the housing and the pipe. If this is done the drill will strike the blow axial to the cylinder and a change in the direction of the hole will be brought about. In order to undercut the rock below the pipe, as for instance in the case of a boulder through which the pipe has to be driven, the same method can be used. In this case the cylinder is again inclined to the axis of the housing and drilling is carried out in the rock immediately below the pipe. When a sufficient depth has been drilled the housing is rotated and drilling is resumed at another angle. These steps are carried out in succession until the rock under the pipe has been sufficiently cut away.

The following is a step by step description of the operation of the drill apparatus of my invention.

The drill is lowered into the pipe 46 by the cable 50 until the bottom of the bit 60 rests on the rock to be drilled. Housing 74 is raised upwardly by pulling on the cable 50 which first causes sliding movement of the cylinder 68 in an upward direction with respect to the housing 48 until the vanes 116 on the said cylinder contact the underside of the upper plate 82U. Thereafter, continued upward pulling on the cable 50 will cause the housing 48 and cylinder 68 to move together upwardly within the pipe 46 to a position where the stud in the lower wheel (not shown) similar to stud 98U in the upper wheel, lies in the groove 100. Air under pressure is admitted to the rubber bag 106 through the pipe 112, inflating the said bag 106 and locking the housing 74 to the pipe 46. The cable 50 is pulled in by a hoist 56 causing the cylinder 68 to rise and the groove 100 to slide over the stud 98U and the corresponding stud on the lower wheel (not shown). As movement continues the grove portion 104 passes over the stud (not shown) on the lower wheel 90L corresponding to the stud 98U on the upper wheel and an angular displacement of cylinder 68 clockwise from the ratchet wheel 90L must take place since ratchet wheel 90L is prevented from turning in a counter clockwise direction by the pawl (not shown) which engages the teeth of the lower ratchet wheel 90L similar to the manner in which pawl 94U engages the teeth of the upper ratchet wheel 90U. Therefore the cylinder 68 must turn in a clockwise direction, rotating ratchet wheel 90U with it due to their connection through stud 98U which extends into the groove 100. During the turning motion the vanes 116 are passing through space 124 between the ribs 118U and 118L. The upward movement is continued until the bottom of the drill bit 60 has been raised high enough above the rock for an effective stroke. During this movement vanes 116 extend into the space between ribs 118U, preventing rotation of the drill. Upon cable 50 being paid out the drill falls and the bit 60 strikes the rock. During this movement groove 100 travels over stud 98U and the groove portion 102 travels over the stud (not shown) in the lower wheel 90L similar to the stud 98U. As groove portion 104 passes over this stud (not shown) in the lower wheel 90L relative angular displacement of the cylinder 68 and ratchet wheel 90L must take place. The cylinder 68 is prevented from turning by the pawl 94U which locks the ratchet wheel 90U and stud 98U which engages groove 100 on the cylinder 68. It is therefore seen that the ratchet wheel 90L must rotate in a clockwise direction. Rotation of the cylinder 68 and drill bit 60 are prevented at the moment of impact by the vanes 116 which fall in spaces between the ribs 118L which are finally attached to the housing 74.

Although I have described embodiments of my invention in specific terms, it is to be understood that various changes may be made in size, shape, materials and arrangement without departing from the spirit and scope of the invention as claimed.

Having described my invention, what I claim and desire to secure by Letters Patent is:

1. A rock drill comprising a drill shaft having its lower end constructed and arranged for the support of a drill bit, cable means engaging and supporting the upper end of said drill shaft, elevating means engaging the cable, means for periodically elevating said drill bit whereby upon release thereof the bit may fall by gravity force into drilling engagement with rock therebelow, means for guiding the bit along a path inclined to the vertical, cam means acting between said guiding means and said drill shaft for rotating said bit about its axis in step by step fashion by a predetermined amount after each said drilling engagement, and cooperating tongue and groove means carried jointly by said drill shaft and said guiding means for holding said bit against rotation in any direction at the moment of impact.

2. A rock drill receivable coaxially within a caisson pipe and comprising a drill shaft having its lower end adapted for the support of a drill bit, cable means engaging and supporting the upper end of said drill shaft for elevating the same periodically whereby upon release thereof the bit may fall by gravity force into drilling engagement with the rock therebelow, a housing having an axial bore for the reception of said drill shaft, releasable locking means acting between said housing and said caisson pipe for locking the housing against relative movement relative to the pipe, whereby said drill shaft is axially reciprocable in said housing, cam means acting between said drill shaft and said housing for angularly rotating said bit about its axis in step by step fashion by a predetermined amount after each said drilling engagement, ratchet means coacting with said cam means, and tongue and groove means acting between said drill shaft and said housing for holding said bit against rotation during the fall thereof into said drilling engagement.

3. A rock drill receivable coaxially within an inclined caisson pipe driven to bed rock for drilling an inclined socket into said bed rock coaxially with said pipe, comprising a drill shaft having its lower end adapted for the support of a drill bit, cable means supporting said drill shaft, means for periodically elevating said drill shaft and bit and for releasing them to fall by gravity force into drilling engagement with rock therebelow, a cylinder encircling and secured to said drill shaft, a housing slidable in said caisson pipe and having an axial bore for the reciprocal reception of said cylinder, a hollow bag disposed between said housing and the iner wall of the caisson pipe, said bag being expandible to lock said housing to said pipe and deflatable to unlock the housing therefrom, at least one pair of longitudinal spaced cam grooves on said cylinder, an inclined cam groove connecting said pair of spaced cam grooves, a ratchet wheel rotatable on said cylinder and having a stud slidably engaging in said cam grooves, a ratchet pawl pivoted in said housing and engaging said ratchet wheel, spaced outwardly projecting tongues on said cylinder, and interrupted longitudinal ribs on said housing forming grooves for the reception and guidance of said tongue, whereby said drill bit is rotatated about its axis in step by step fashion after each said drilling engagement with said rock, and said bit is constrained into substantially straight line movement and prevented from rotation during downward motion into said drilling engagement with said rock.

4. A rock drill apparatus of the class described comprising a housing, a drill bit and a drill shank in said housing, means for elevating said shank and bit above a rock surface to be drilled, means for releasing said shank and bit so that the bit may impact with the rock, means for rotating said shank and bit about the shank axis for a predetermined amount on each stroke, means on the interior of the housing and coengaging means on the shank cooperating therewith at spaced portions thereof to guide the shank in its movement and to prevent rotation of the shank and bit at each end of the stroke while permitting the rotation of the shank and bit while traversing the space between said predetermined portions.

HAROLD P. BURRELL.

REFERENCES CITED

The following references are of record in the file of this patent:

UNITED STATES PATENTS

| Number | Name | Date |
| --- | --- | --- |
| 1,148,366 | Dyson | July 27, 1915 |
| 1,331,103 | Gildea | Feb. 17, 1920 |
| 1,484,065 | Gould | Feb. 19, 1924 |
| 1,525,740 | Howard | Feb. 10, 1925 |
| 1,625,776 | Alelson | July 12, 1927 |
| 1,639,242 | Versteeg | Aug. 16, 1927 |
| 1,712,868 | Boynton | May 14, 1929 |
| 1,866,943 | Simmons | July 12, 1932 |
| 2,009,461 | Wichert | July 30, 1935 |
| 2,371,498 | Boynton | Mar. 13, 1945 |
| 2,444,842 | McConahey et al. | July 6, 1948 |